Aug. 15, 1933.　　　M. BERKOWITZ　　　1,922,349
MOTION PICTURE PROJECTING MACHINE
Filed Aug. 5, 1930
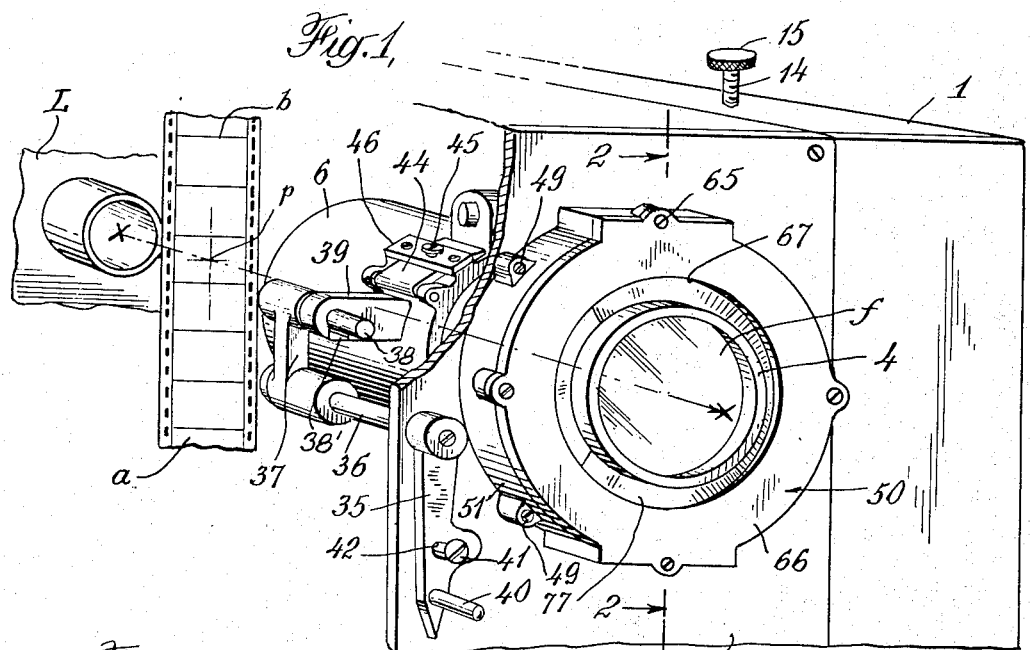
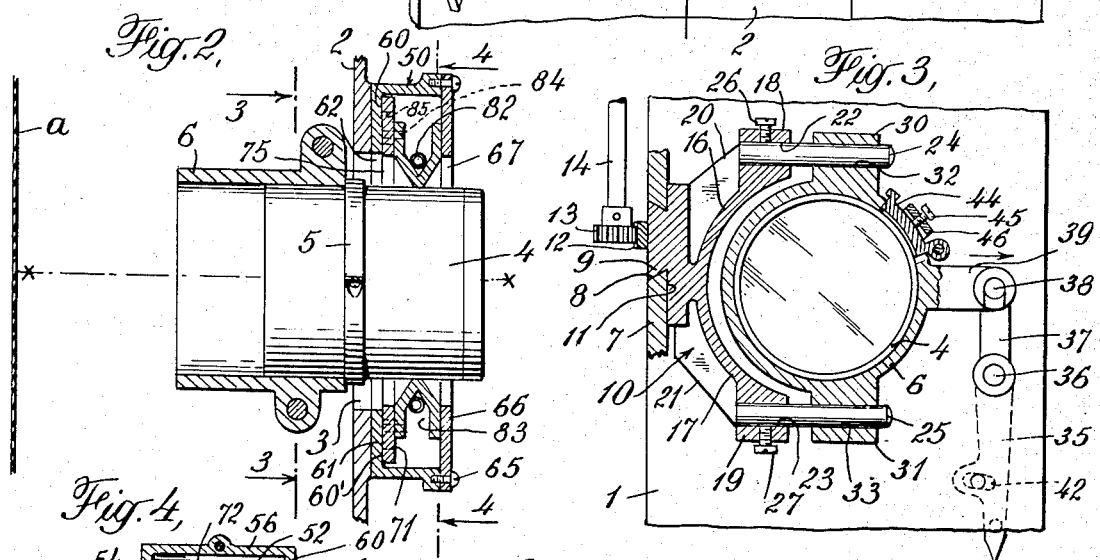
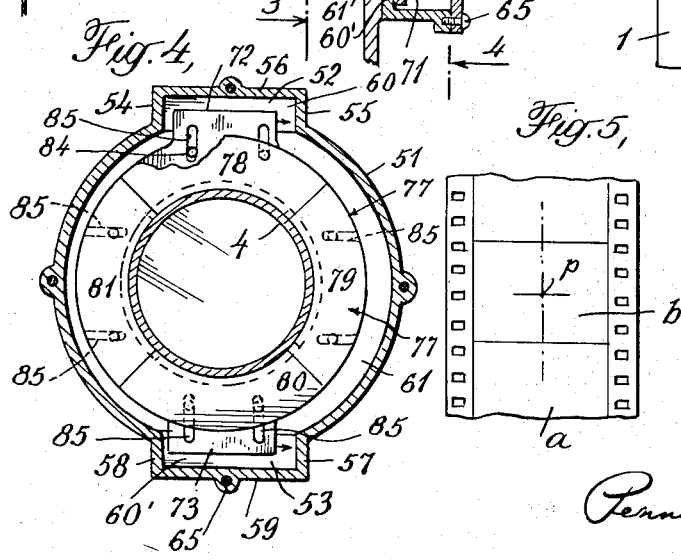
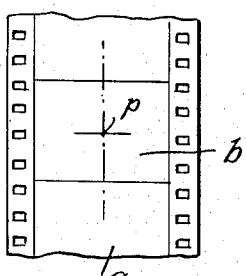
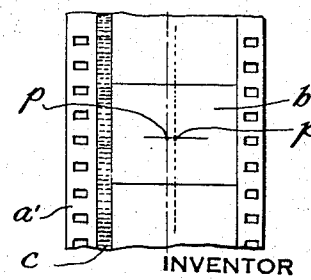
INVENTOR
MICHAEL BERKOWITZ
BY
Pennie, Davis, Marvin & Edmonds
ATTORNEYS Patented Aug. 15, 1933

1,922,349

UNITED STATES PATENT OFFICE 1,922,349

MOTION PICTURE PROJECTING MACHINE

Michael Berkowitz, New York, N. Y., assignor to United Research Corporation, Long Island City, N. Y., a Corporation of Delaware Application August 5, 1930. Serial No. 473,174

9 Claims. (Cl. 88—24)

This invention relates to improvements in motion picture projecting machines and has for its object the provision of a projector capable of interchangeable use with films in which the picture blocks occupy either a central or non-central position relative to the longitudinal edges of the film, means being provided for readily adapting the machine for use with either type of film.

Until a short time ago the type of film which was used almost exclusively in commercial motion picture projecting apparatus was the film of 35 mm. width having its picture squares medially located thereon, the term "picture square" being used to imply those rectangular areas printed upon the film which are adapted to be successively brought into position intermediate a light source and a projecting lens for brief exposure to a beam of light for casting a rapid succession of images upon a screen. As a consequence motion picture projectors had become standardized insofar as their construction contemplated the mounting of their lens holders in a fixed central position with respect to the film, although capable of movement in a direction perpendicularly thereof for bringing an image to sharp focus upon the screen. With the advent, however, of "sound" pictures within recent years a new type of film has come into existence. This film manufactured in accordance with one system of sound recording departs from the heretofore standard type of film by allotting a portion of the film adjacent one edge to the sound record, the remainder of the film (neglecting the relatively small area required for the marginal sprocket feed perforations) being occupied by the picture square. Since the same relative shape of the picture squares has been retained in these sound films this as a consequence has required a reduction in the actual size of the picture squares and a displacement slightly off center with respect to the median line of the film.

The existence of these two types of films in the industry has led to embarrassment among motion picture exhibitors due to the fact that their projecting machines, by reason of the fixed transverse location of their lenses, are not suitable for the employment of films in which the picture blocks are located non-centrally thereon, such type of film being more particularly designed for use in a special form of projector having means for translating the sound record into music or speech. While many exhibitors of motion pictures owing to the excessive cost of such projecting apparatus have been unable to give sound performances, they have nevertheless found it possible to make use of the picture record contained on this class of films and dispensing with the sound record. This has been accomplished by using in the conventional form of projector designed for utilizing silent films a modified form of aperture plate—that is, a plate having an opening therein with which the film squares are successively brought into registry during exposure to the light beam—such aperture plate having its opening conforming in dimensions to the smaller sized picture squares of the sound film and correspondingly located with respect to the position occupied by the squares upon the film. Such an expedient, however, has not proved entirely satisfactory inasmuch as the lens of a projecting machine designed for use with silent films as before stated is located in a central position relatively to the film. Thus, when a sound film of the type described is employed in a standard projecting machine the axis of the lens does not coincide with the geometrical center of the picture square positioned in front of the lens, hence there results a certain amount of distortion in the image cast upon the screen, a perceptible blur occurring in those parts of the picture defined by the rays of light passing through the thinner circumferential edges of the lens.

The present invention aims to overcome the above objection by providing a projecting machine adapted for use in interchangeably exhibiting both silent films and sound films of the class in which the picture squares are non-centrally located upon the film, means being provided for insuring the uniform quality of the projected images in the exhibition of both types of films. More specifically the invention contemplates the provision of a lens holder capable of adjustment in a plane parallel to the path of the film strip so as to bring the center of the lens into alignment with the geometrical center of the picture square upon the film when it is in projecting position, the customary means for adjusting the lens in a direction perpendicular to the film being retained.

A further feature of this invention is the provision of a floatingly mounted escutcheon plate to permit it to automatically follow the lateral travel of the lens tube, when the lens holder is adjusted transversely of the film.

While there is illustrated in conjunction with the embodiment of the invention about to be described an expansible escutcheon ring through which the lens tube is designed to extend into the interior of the projector housing, this feature constitutes no essential part of the present invention but forms the subject of a copending application, Serial No. 473,175, filed August 5, 1930 by Michael Berkowitz. Nor are the novel features of the present invention limited in their application to any particular form of projecting machine but in addition to the conventional types of machines now in use, they may be embodied in a projector capable of selectively utilizing films of different widths such as forms the subject of a copending application, Serial No. 473,173, filed August 5, 1930 by Michael Berkowitz.

The invention will be better understood from the following detail description of one exemplification, reference being had to the annexed drawing in which:

Figure 1 is a perspective view of a portion of a projecting machine embodying the present invention and showing the transversely shiftable lens holder and floating escutcheon plate assembled therewith;

Figure 2 is a cross-sectional view of the lens holder and escutcheon plate on the plane 2—2 of Figure 1;

Figure 3 is a cross-sectional view of the lens holder on the plane 3—3 of Figure 2;

Figure 4 is a cross-sectional view of the escutcheon plate on the plane 4—4 of Figure 2;

Figure 5 is a fragmentary showing of a silent film; and

Figure 6 is a fragmentary showing of a well-known type of sound film indicating the relative locations of the centers of the picture squares carried by the sound and silent films.

In Fig. 1 is shown the position occupied by a silent film $a$ in a projecting machine of conventional type the film being fed intermittently downward by mechanism which it is not necessary to describe since various forms of film feeding mechanisms are comprehended within the prior art and the subject matter of this invention is independent of any particular form. The film during the time it is exposed to the beam of light emanating from the lamphouse L reposes in a vertical plane perpendicular to the axis of the projecting lens $f$. The axis of the lens $f$ is indicated by the broken line $x—x$ extended to the face of the film $a$ where it intersects the geometrical center $p$ of a picture square $b$. As better shown in Fig. 5 the picture square $b$ occupies a medial position upon the strip and, by virtue of having its geometrical center $p$ in coincidence with the axis of the lens $f$, a clearly defined image is thrown upon the screen. When, however, it is desired to utilize a film $a'$ of the form shown in Fig. 6 in which the picture squares $b'$ are located nearer to one marginal edge of the film than to another the geometrical center of the differently dimensioned picture square $b'$ becomes located at the point $p'$. In order, therefore, to center the lens $f$ with respect to the smaller picture block $b'$ so that the most perfect image of which the lens is capable will be projected upon the screen, means must be provided for shifting the lens a slight distance transversely of the film. The manner in which this is accomplished will now be described.

In Figs. 1 and 2 is shown a portion of a projecting machine comprising in part a housing 1 having attached thereto in the usual manner a plate 2 provided with a circular opening 3. Extending through the opening 3 is a lens tube 4 having positioned thereon intermediate its length a stop collar 5. One end of this tube is slidably received within a lens holder 6 with the stop collar 5 abutting against the forward end of the lens holder. The lens tube 4 is of the usual construction containing therein an objective lens of suitable design for bringing to focus upon a screen a beam of light emanating from the lamphouse L located to the rear of the film.

The lens holder 6 is mounted for both axial and transverse movement in the following manner: Formed within a vertical wall 7 of the projection housing 1 is a horizontal reentrant slot 8, as shown in Fig. 3, extending a substantial distance along the wall 7 in parallelism with the axis of the tube holder 6. Slidingly received within the slot 8 is a wedge-shaped tongue 9, this tongue constituting an integral part of a carriage 10. One vertical wall 11 of the carriage slips along the inner surface of the wall 7, and, in conjunction with the tongue 9 extending laterally therefrom, maintains the carriage in assembly with the wall. A rack 12 fixed upon the outer surface of tongue 9 is arranged to be engaged by a pinion 13 carried at the lower end of a vertically mounted shaft 14. This shaft extends through and protrudes above the housing 1 and is capable of being rotated by a thumbpiece 15 fixed upon its upper end. No novelty is claimed for the structure just described.

The carriage 10 comprises a casting having segmental arms 16 and 17 strengthened by webs 20 and 21. The arms 16 and 17 are united to form an arc of approximately 180° and of slightly greater radius than the lens holder 6. The remote ends of the arms 16 and 17 lie in a common vertical plane and are provided respectively with lugs 18 and 19 recessed to provide sockets 22 and 23 in which are received horizontally extending pins 24 and 25. These pins are held by set screws 26 and 27.

Upon the pins 24 and 25 is adapted to slide the lens holder 6, and to this end the lens holder has formed upon opposite sides of its circumference so as to lie in a common vertical plane two projections 30 and 31 with apertures 32 and 33 respectively formed therein to slidingly receive the horizontally extended ends of the pins 24 and 25. The lens holder is arranged to be shifted back and forth along the pins 24 and 25 by means of a lever 35 rigidly attached to one end of a shaft 36. The shaft 36 is rotatably mounted in the wall 2 of the housing and extends parallel to the lens holder 6 for a portion of its length where it has rigidly affixed thereto an upright arm 37 which is connected by means of a pivot pin 38 to a horizontal projection 39 formed integral with the lens holder 6. The projection 39 has sliding engagement with the pin 38 and it may be removed therefrom by reason of the inverted U shaped slot 38'. For the purpose of rocking the arm 35 a finger-piece 40 extends laterally therefrom; and the arm may be retained in any position of adjustment by means of a set-screw 41 threadedly mounted in the plate 2 and projecting through an arcuate slot 42 formed in the arm. The usual means for maintaining the lens tube 4 in assembly with the holder 6 is afforded by a segmentally-shaped flap 44 adapted to be compressed into tight frictional engagement with the circumference of the tube 4 by means of an adjusting screw 45 threadedly mounted in a support 46 located above the flap.

In order that the lens tube 4 may be permitted to shift its position within the opening 3 as the lens holder 6 is moved transversely of the film, it is necessary that the escutcheon plate be floatingly mounted to follow the movement of the lens tube but at the same time sealing the edges of opening 3 against the passage of light from the interior of the housing 1. To meet these conditions the escutcheon plate 71 is carried in an escutcheon box 50 fastened by means of screws 49 upon the wall 2 of the housing and centralized with respect to the opening 3 therein. This escutcheon box consists of a shell 51 of generally cylindrical form but departing from a true cylinder by the provision at diametrically opposite points upon its circumference of a pair of rectangular offsets 52 and 53. The offset 52 is defined by two spaced vertical wall portions 54 and 55 and a horizontal connecting wall portion 56; while the offset 53 is similarly formed by two spaced vertical wall portions 57 and 58 and a horizontal connecting portion 59. The shell 51 is formed at one end with a flange 61 as shown in Fig. 2 defining a circular opening 62 of the same size as the aperture 3 in the housing wall 2. Attached by means of screws 65 to the opposite end of the shell 51 is a cover plate 66 of a shape corresponding to that of the shell. This cover plate has a circular opening 67 therein corresponding in size to the opening 62 at the rear of the escutcheon box so that when the escutcheon box is assembled upon the projector housing 1 with the flange 61 in engagement with the exterior surface of wall 2, the opening 3 in the wall 2, the opening 62 defined by the flange 61, and the opening 67 of the cover plate 66 are all located in axial alignment.

Enclosed within the escutcheon box 50 is an escutcheon plate 71 of generally circular shape. This plate is of a smaller diameter than the shell 51 but is of sufficient size to appreciably overlap the edges of flange 61. The plate 71 has two diametrically opposed ears 72 and 73 extending from its circumference, the arrangement being such that the plate is capable of loose assembly within the shell 51, the ears 72 and 73 being received within the space defined by offsets 52 and 53. Sufficient clearance is provided between the edges of the plate and the interior of the shell 51 to permit limited lateral shifting movement of the plate relative to the shell, the ears riding against the flat bearing surfaces 60 and 60' during such movement to maintain the plate in a vertical plane. A circular opening 75 of approximately the diameter of aperture 62 in the bottom of the box 50 is formed in the plate 71 through which the lens tube 6 extends.

Supported upon the plate 71 is an expansible escutcheon ring 77 composed of a plurality of segments 78, 79, 80 and 81 disposed in end-to-end abutting relation. These segments are provided with converging walls intersecting in an arc forming a portion of the inner circumference of the assembled ring and defining an external groove 83. A spiral spring 82 received within the groove 83 resiliently holds the segments in assembly but permits of their radial movement, the pins 84 carried by the individual segments entering slots 85 formed in the escutcheon plate 71 insuring the travel of the segments in a straight path. By the above construction, when a lens tube 4 is thrust axially through the opening 67 in the cover plate 66 the collar will engage the sloping walls of the escutcheon ring 77 and wedge the segments apart to permit the ring to pass therethrough, after which they will close into engagement with the cylindrical surface of the tube to effect a light-tight seal.

The operation of the embodiment of the invention just described is as follows: Assuming that it is desired to change from a silent film of the form shown in Fig. 5 to a sound film of the form shown in Fig. 6, the lens $f$ must usually be replaced by a different lens appropriately designed for use with the smaller size picture square. Consequently the lens tube 4 is withdrawn axially through the opening in the escutcheon box and a new lens tube is inserted, the yielding segments 78, 79, 80 and 81 of the escutcheon ring 77 permitting the collar 5 carried by the lens tubes 4 to freely pass into and out of the housing.

A suitable aperture plate having been assembled in the projector, the opening contained in this plate will indicate to the machine operator the size and location of the image upon the screen when a beam of light from the lamphouse is passed therethrough. The block of light is centered upon the screen and the lens then moved in a direction perpendicularly of the film by turning the thumbpiece 15 until the edges of the opening in the aperture plate are sharply defined upon the screen. In order to correct distortion which may result by reason of the non-coincidence of the axis of the lens with the geometrical center of the opening in the aperture plate (which will correspond with the center of the exposed picture square when the film is being passed thru the machine), the arm 35 is rocked backwards and forwards by the operator to move the lens across the opening in the aperture plate. By reason of the floating arrangement of the escutcheon plate 71, when the lens holder is moved laterally this plate is free to follow the travel of the lens tube while the appreciable overlap of the plate 71 with respect to the flange 61 prevents the escape of light from the interior of the housing. When a position is attained where the outline of the block of light is defined with equal sharpness thruout its perimeter, the arm 35 is clamped in adjusted position by tightening the set screw 41. The sound film is next inserted and the machine set in operation. As the projection of pictures upon the screen progresses, still more precise adjustment of the lens may be obtained by releasing the screw 41 and observing the effect upon the quality of the image caused by very slowly shifting the lens back and forth across the film in small increments of movement.

What I claim is:

1. In a motion picture projector having a wall and in which a film is adapted to pass in a vertical fixed path in front of a light source, the combination of a projecting lens, a holder for receiving the lens and arranged to be guided in a path transversely of the film, means for imparting movement to the lens holder for shifting the lens transversely of the film, said last named means consisting of a lever operatively connected to the lens holder and designed for manual operation, and means for mounting said lever on the wall of the projector.

2. In a motion picture projector in which a film is adapted to pass in a vertical fixed path in front of a light source, the combination of a projecting lens, a holder for receiving the lens, said holder being mounted for sliding movement in directions both perpendicular and parallel to the plane of the film, hand-operated means for imparting movement to the holder in either direction a radially adjustable escutcheon plate, and means for supporting said plate to form sealing contact with said lens in its adjusted positions and with different sizes of lenses.

3. In a motion picture projector in which a film is adapted to pass in a vertically fixed path in front of a light source, the combination of a projecting lens, a holder for receiving the lens a light-tight shield for said lens comprising a radially adjustable escutcheon plate, a carriage movable in a direction perpendicular to the plane of the film, means for mounting the lens holder upon the carriage for movement in a direction transversely of the film, means for imparting movement to the carriage and additional means for imparting movement to the lens holder.

4. In a motion pitcure projector in which a film contained within a housing is adapted to pass in a vertical fixed path in front of a light source, the combination of a lens tube extending through an oversize opening in the housing, means for shifting the lens tube transversely in the opening, a shield having an adjustable opening therein for sealing the clearance between the opening and the lens in all positions of the lens, and means for supporting said shield.

5. In a motion picture projector in which a film contained within a housing is adapted to pass in a vertical fixed path in front of a light source, the combination of a lens tube extending through an oversize opening in the housing, means for shifting the lens transversely in the opening, shielding means arranged in part to partake of the transverse movement of the lens tube and seal the edges of the opening against the passage of light, and means for holding stationary a part of said shielding means while permitting movement of said first-mentioned part thereof.

6. In a motion picture projector in which a film is adapted to pass in a vertical fixed path in front of a light source, the combination of a lens tube extending through an oversize opening in the housing, means for shifting the lens tube transversely in the opening, a radially resilient ring surrounding the tube and in light-tight engagement therewith, and a casing enclosing the ring and providing sufficient space for transverse movement of the ring within the casing, said casing having inwardly directed edges arranged to overlap the exterior edges of the ring in its different positions for preventing the passage of light.

7. In a motion picture projector, a lens mount, comprising a lengthwise adjustable frame, transverse pins thereon, a lens tube carrier having openings engaging with said pins, a rocker-lever system for moving said tube along said pins, a wall having an aperture for said lens tube, and means for mounting said rocker-lever system on said wall.

8. In a motion picture projector, a lens mount, comprising a lengthwise adjustable frame, transverse pins thereon, a lens tube carrier having openings engaging with said pins, whereby said lens tube may be shifted laterally a resilient light shield surrounding said lens tube and movable therewith, and stationary means for supporting said light shield.

9. In a motion picture projector, a lens tube carrier, means for moving said carrier axially, additional means for moving said carrier transversely, a lens tube having a stop ring therearound and lens elements therein, and a resilient escutcheon plate adapted to permit the passage therethrough of said stop ring, during the insertion of said lens tube.

MICHAEL BERKOWITZ.